US012773691B2

(12) United States Patent
Okabe et al.

(10) Patent No.: US 12,773,691 B2
(45) Date of Patent: Oct. 27, 2026

(54) AUTOMATIC ANALYZER

(71) Applicant: Hitachi High-Tech Corporation, Tokyo (JP)

(72) Inventors: Shugo Okabe, Tokyo (JP); Takenori Okusa, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 1227 days.

(21) Appl. No.: 17/607,502

(22) PCT Filed: Feb. 25, 2020

(86) PCT No.: PCT/JP2020/007328
§ 371 (c)(1),
(2) Date: Oct. 29, 2021

(87) PCT Pub. No.: WO2020/230402
PCT Pub. Date: Nov. 19, 2020

(65) Prior Publication Data

US 2022/0219167 A1 Jul. 14, 2022

(30) Foreign Application Priority Data

May 15, 2019 (JP) ................................ 2019-091877

(51) Int. Cl.
*B01L 3/00* (2006.01)
*G01N 35/04* (2006.01)
*G01N 35/10* (2006.01)

(52) U.S. Cl.
CPC ........ *B01L 3/502715* (2013.01); *G01N 35/04* (2013.01); *G01N 35/1002* (2013.01);
(Continued)

(58) Field of Classification Search
CPC ....... B01L 3/502715; B01L 2300/0609; B01L 2300/0645; B01L 2300/0654; G01N 35/04; G01N 35/1002; G01N 2035/0443
See application file for complete search history.

(56) References Cited

U.S. PATENT DOCUMENTS 6,440,369 B1 * 8/2002 Oonuma .......... G01N 35/00594 422/63
2004/0265173 A1 12/2004 Matsumoto et al.
(Continued)

FOREIGN PATENT DOCUMENTS

CN 108593949 A 9/2018
JP 2004-333259 A 11/2004
(Continued)

OTHER PUBLICATIONS

International Search Report, mailed May 26, 2020, for International Application No. PCT/JP2020/007328.

*Primary Examiner* — Charles Capozzi
*Assistant Examiner* — Alex Ramirez
(74) *Attorney, Agent, or Firm* — Baker Botts L.L.P.

(57) ABSTRACT

Provided is an automatic analyzer capable of simplifying control of a holding unit that holds a plurality of containers having access to an aspiration nozzle whose position is fixed and that rotates and moves up and down. The automatic analyzer includes an aspiration nozzle whose position is fixed and that aspirates reaction liquid or reagent, and a holding unit that holds a plurality of containers accommodating the reaction liquid or the reagent, and that rotates and moves t up and down. The holding unit holds at least three of the containers, and an angle between adjacent containers is an integer multiple of a predetermined angle. The angle between adjacent containers is an angle between adjacent
(Continued)

containers in a circumferential direction and an angle around a rotation center of the holding unit.

14 Claims, 7 Drawing Sheets

(52) U.S. Cl.
CPC .................. *B01L 2300/0609* (2013.01); *B01L 2300/0645* (2013.01); *B01L 2300/0654* (2013.01); *G01N 2035/0443* (2013.01)

(56) References Cited

U.S. PATENT DOCUMENTS

| | | | | |
|---|---|---|---|---|
| 2011/0300021 | A1 | 12/2011 | Sakairi et al. | |
| 2013/0125671 | A1* | 5/2013 | Sakashita ........... | G01N 35/1081<br>73/863.01 |

FOREIGN PATENT DOCUMENTS

| | | | |
|---|---|---|---|
| JP | 2010-032215 | A | 2/2010 |
| JP | 2012-026732 | A | 2/2012 |
| JP | 2014-139589 | A | 7/2014 |
| JP | 2014-206380 | A | 10/2014 |

* cited by examiner

[FIG. 1]
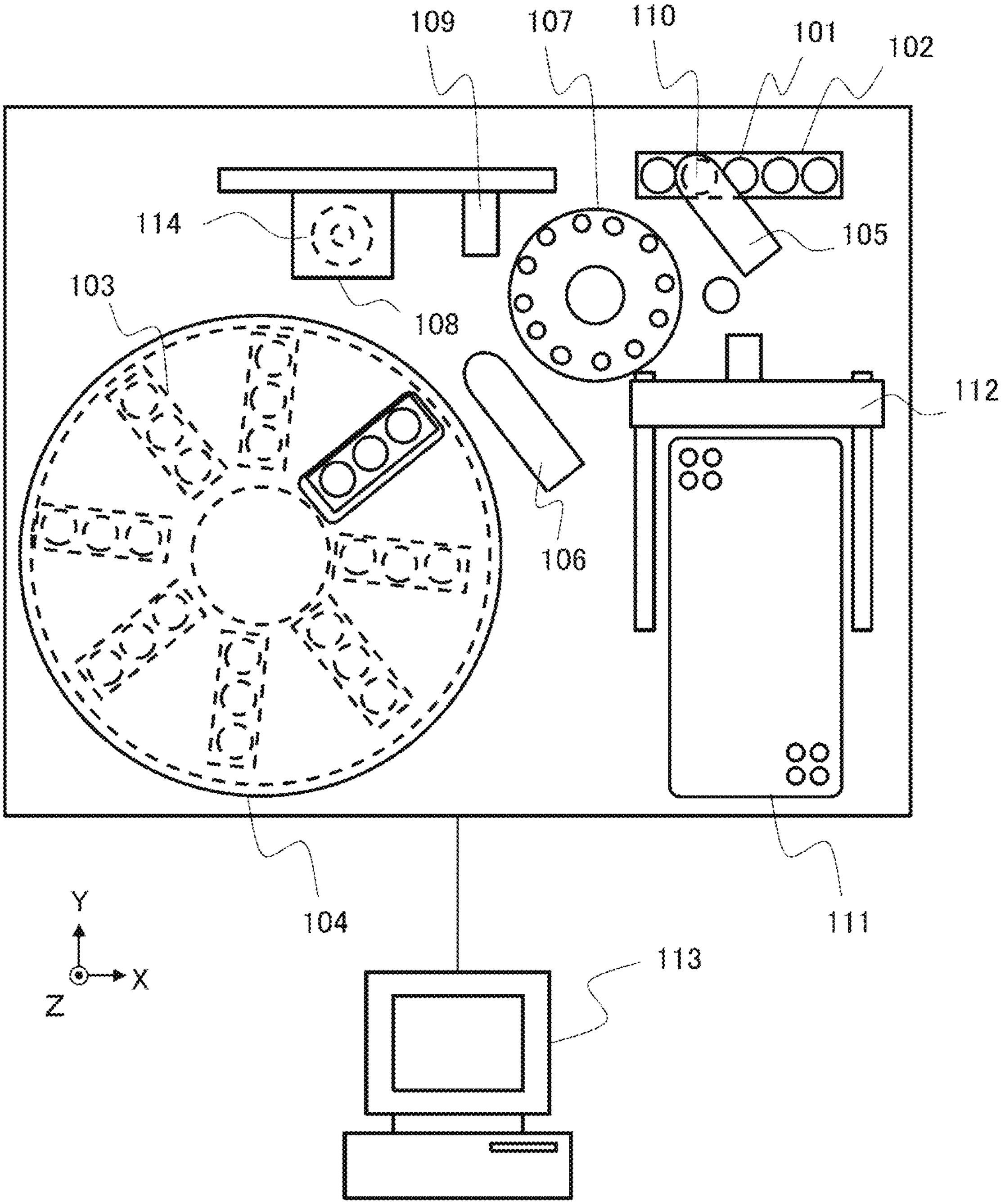

[FIG. 2]
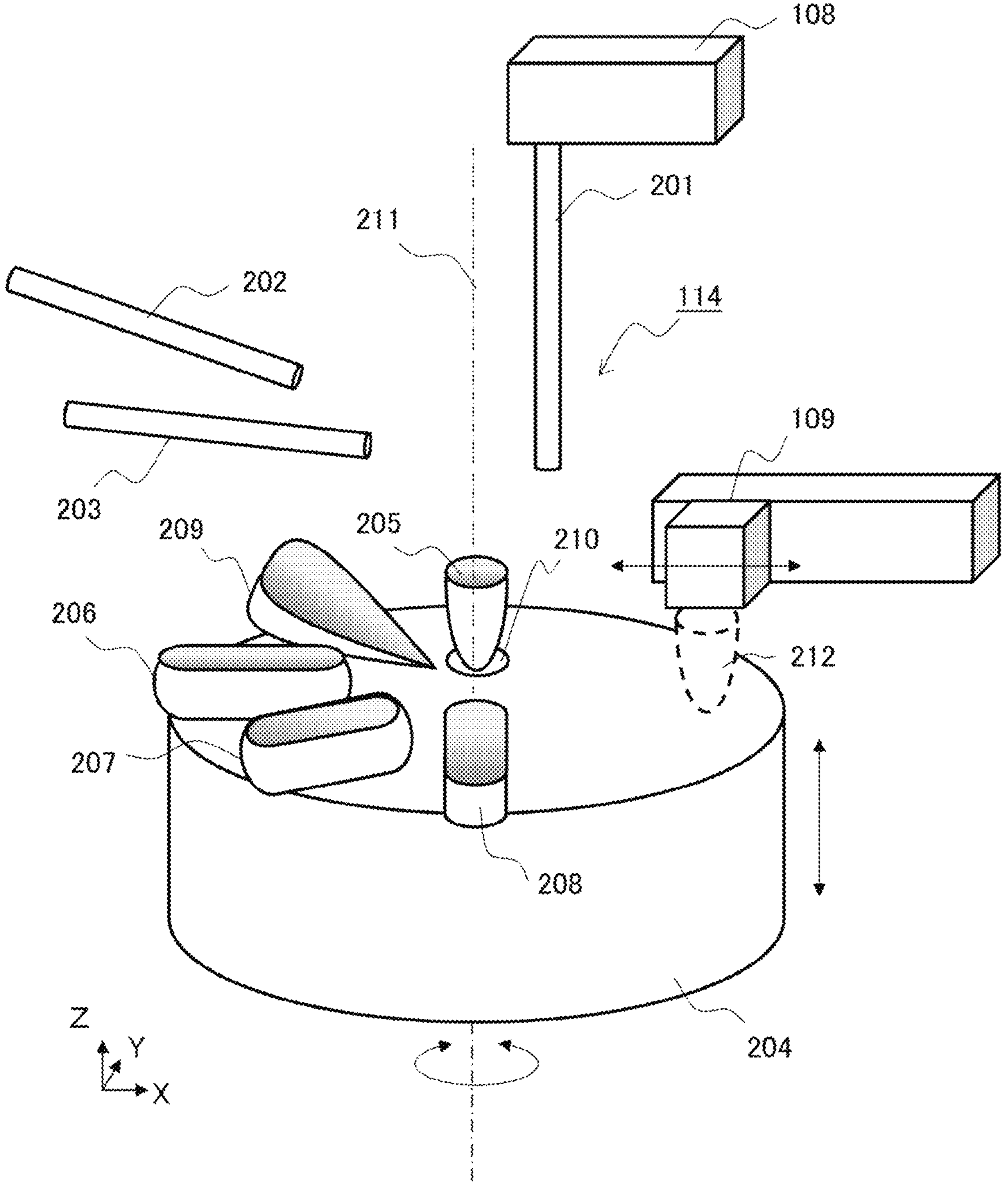

[FIG. 3]
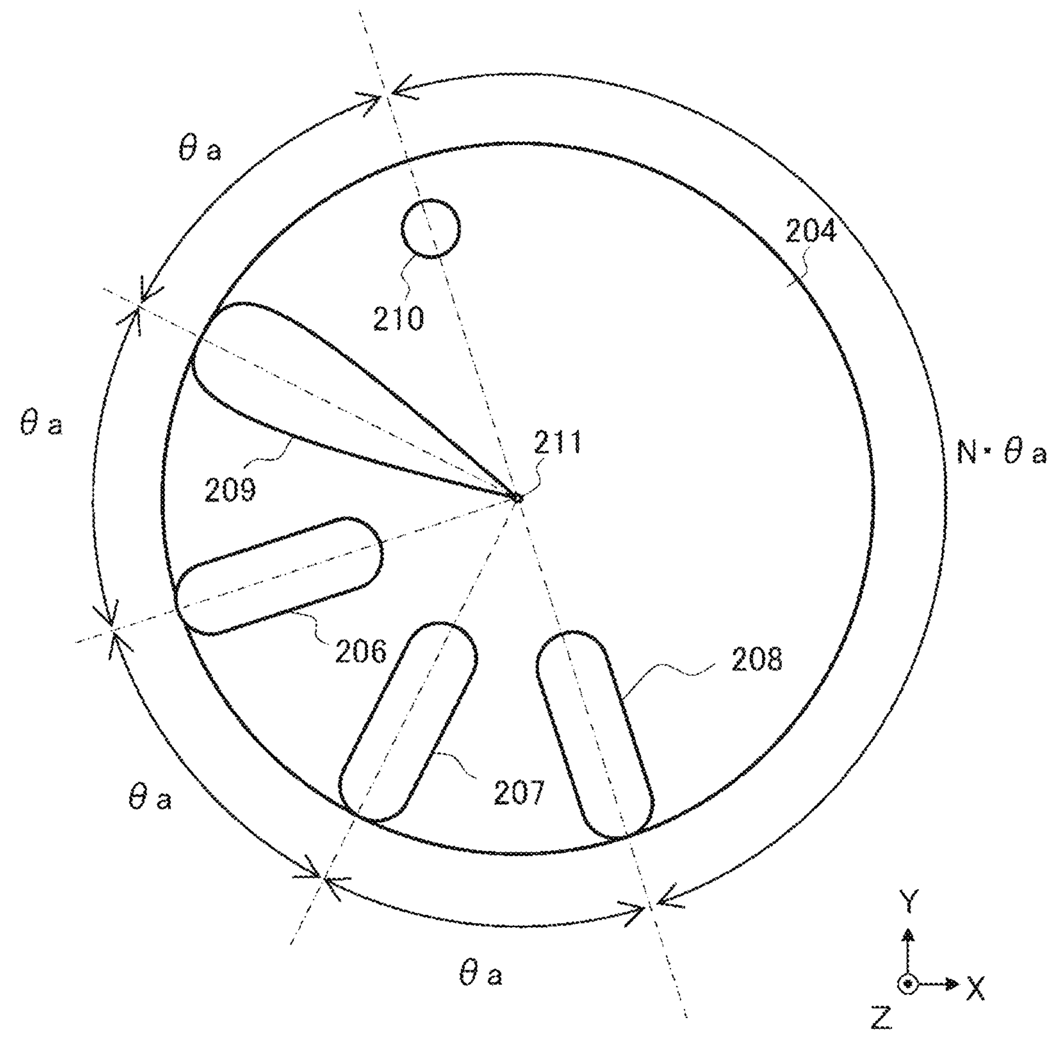

[FIG. 4]
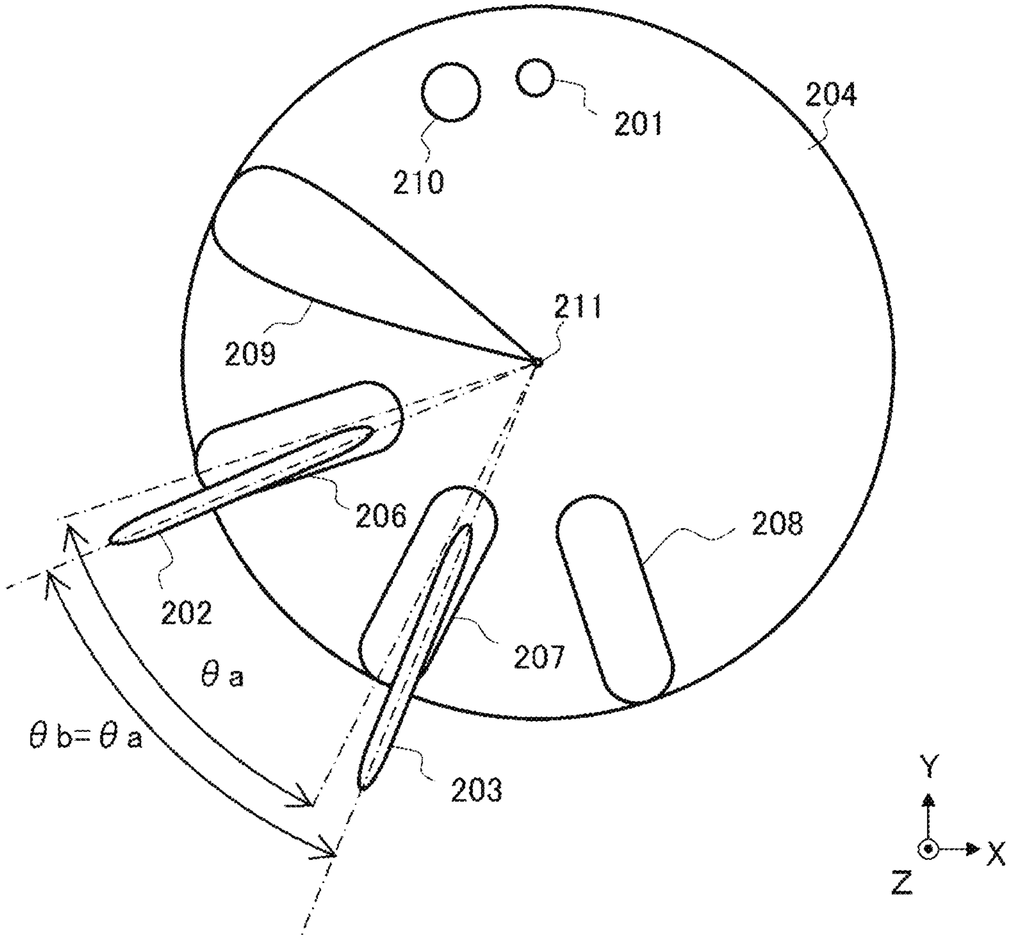

[FIG. 5]
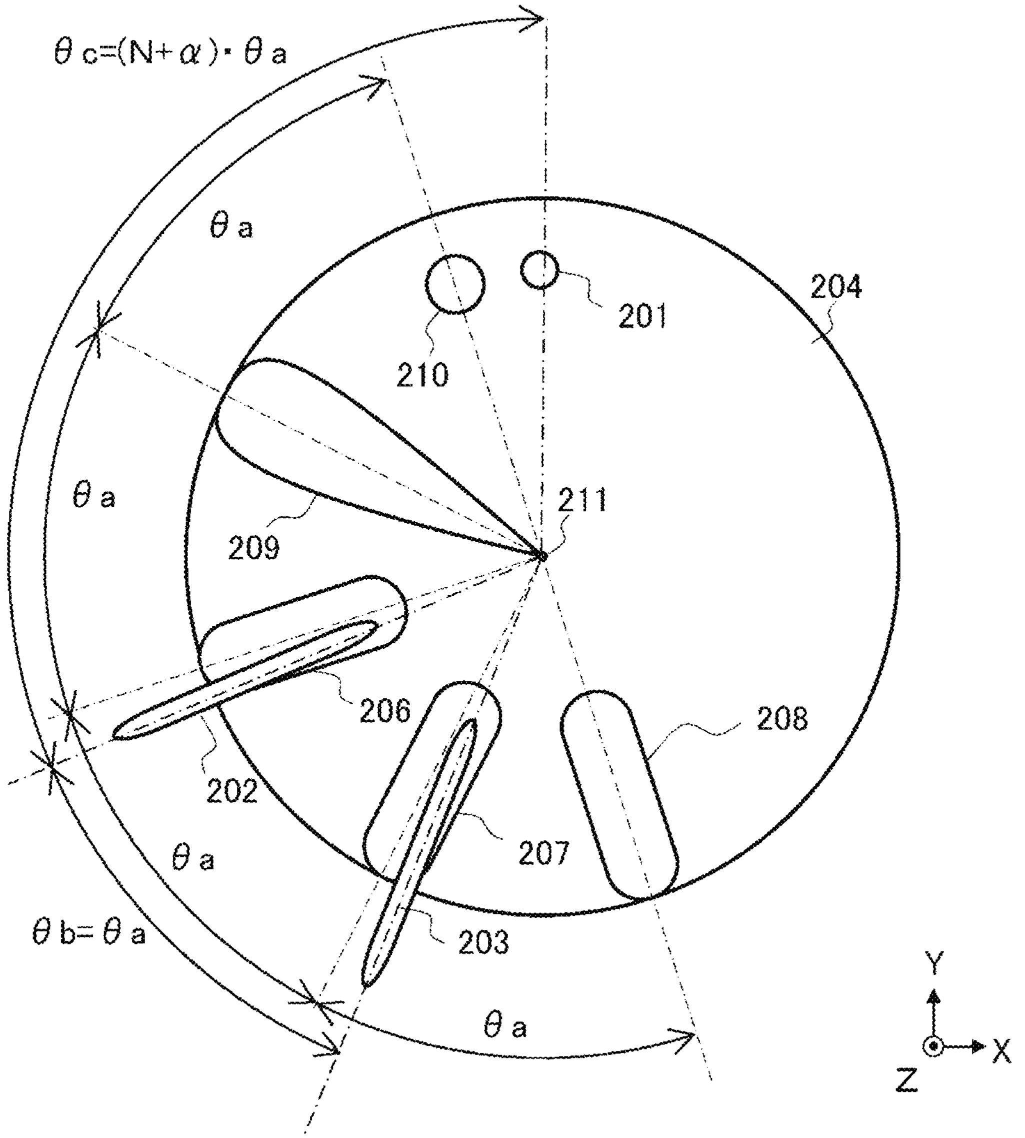

[FIG. 6]
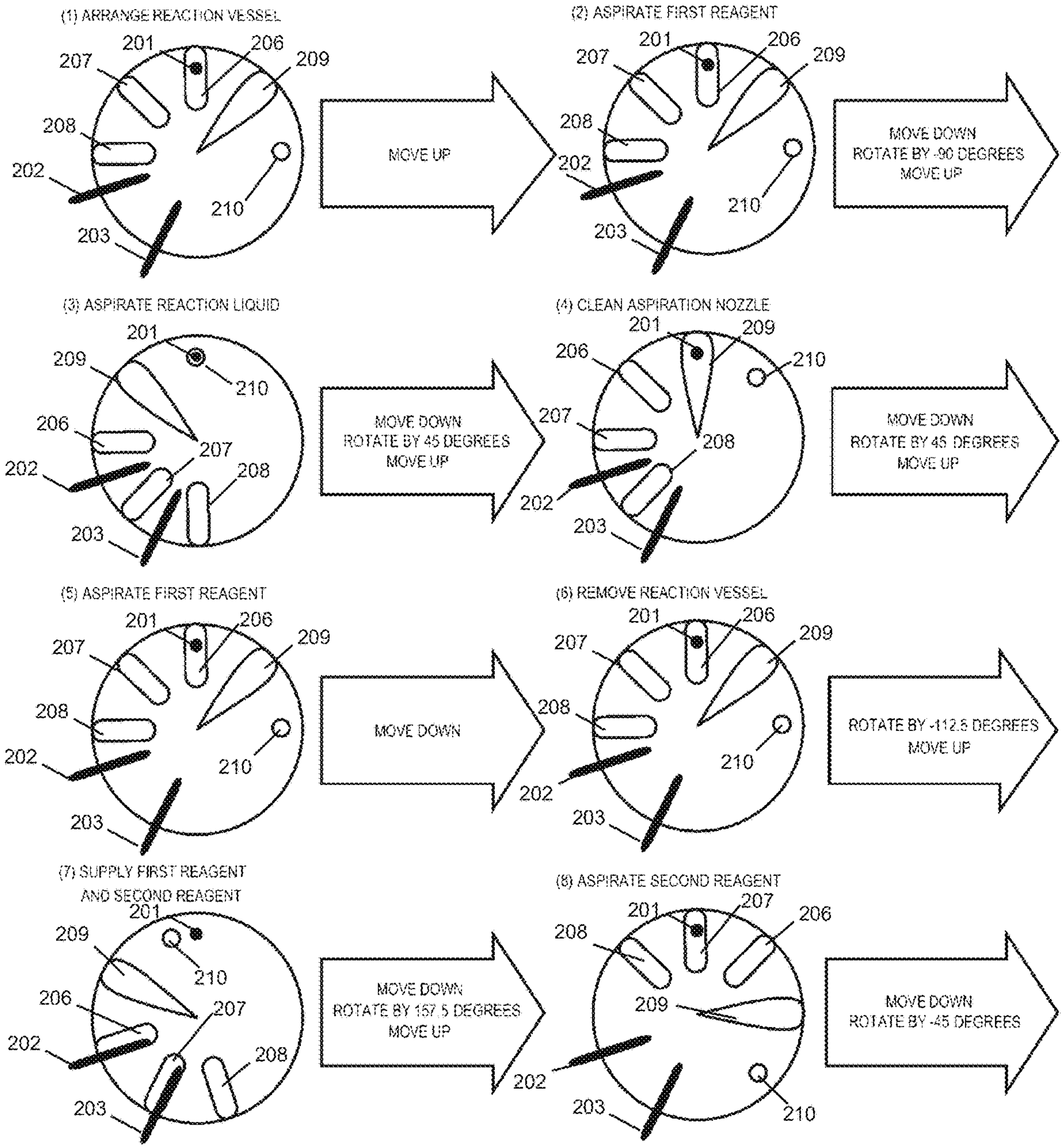

[FIG. 7]
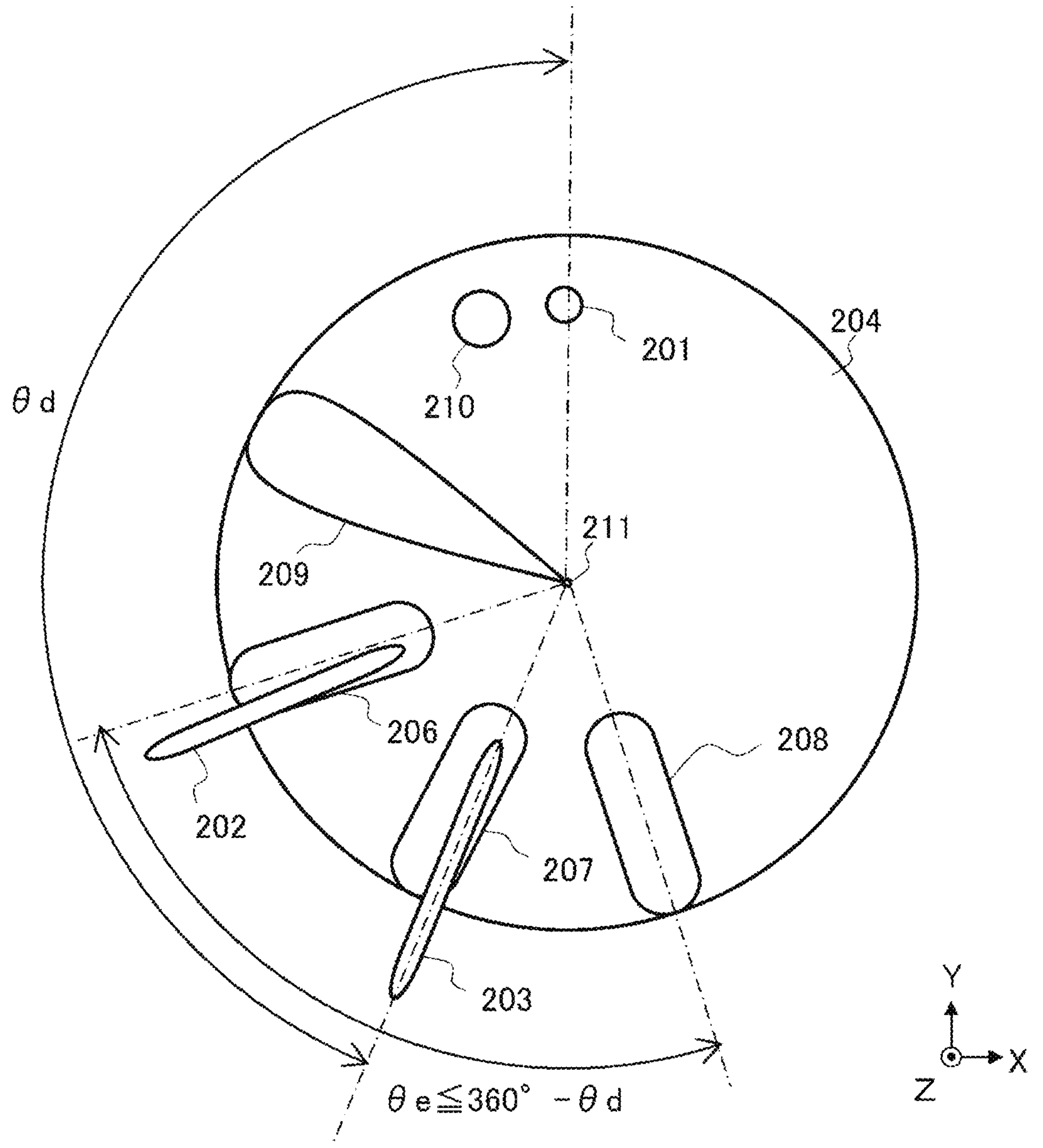

AUTOMATIC ANALYZER

TECHNICAL FIELD

The present invention relates to an automatic analyzer.

BACKGROUND ART

An automatic analyzer is a device for automatically quantifying or qualitatively analyzing a specific component contained in a sample such as blood or urine. In an automatic analyzer, a reagent or reaction liquid containing a sample and a reagent for analysis is aspirated from an aspiration nozzle and transferred to a measurement unit or the like through a flow path connected to the aspiration nozzle. When a tube with a variable shape is provided between the aspiration nozzle and the measurement unit, the inner diameter may fluctuate due to bending or expansion and contraction of the tube, and the flow of the reaction liquid may change. The change of the flow of the reaction liquid makes the components of the reaction liquid transferred to the measurement unit non-uniform, and deteriorates the reproducibility of measurement results.

PTL 1 discloses an automatic analyzer that makes components of reaction liquid sent to a measurement unit uniform to improve the reproducibility of measurement results by connecting an aspiration nozzle directly to the measurement unit and allowing the aspiration nozzle fixed to the measurement unit to access a reaction vessel accommodating the reaction liquid.

CITATION LIST

Patent Literature

PTL 1: JP-A-2014-139589

SUMMARY OF INVENTION

Technical Problem

However, PLT 1 does not give consideration to simplifying control of a holding unit that holds the reaction vessel and the like having access to the aspiration nozzle fixed to the measurement unit and that rotates and moves up and down. In addition to the reaction vessel, the containers having access to the aspiration nozzle include a reagent container that accommodates a reagent and a washing tank that is used to clean the aspiration nozzle, and the rotation and the ascending and lowering of the holding unit that holds the plurality of containers is repeated many times, and therefore, it is desirable that the control of the holding unit be simplified as much as possible.

Therefore, an object of the invention is to provide an automatic analyzer capable of simplifying control of a holding unit that holds a plurality of containers having access to an aspiration nozzle whose position is fixed and that rotates and moves up and down.

Solution to Problem

In order to achieve the above object, the invention provides an automatic analyzer including an aspiration nozzle whose position is fixed and that aspirates reaction liquid or a reagent, and a holding unit that holds a plurality of containers accommodating the reaction liquid or the reagent, and that rotates and moves up and down. The holding unit holds at least three of the containers, and an angle between adjacent containers is an integer multiple of a predetermined angle. The angle between adjacent containers is an angle between adjacent containers in a circumferential direction and an angle around a rotation center of the holding unit.

Advantageous Effect

According to the invention, it is possible to provide an automatic analyzer capable of simplifying control of a holding unit that holds a plurality of containers having access to an aspiration nozzle whose position is fixed and that rotates and moves up and down.

BRIEF DESCRIPTION OF DRAWINGS

FIG. 1 is a plan view showing a configuration example of an automatic analyzer.

FIG. 2 is a perspective view showing an example of a reaction liquid and reagent transfer unit.

FIG. 3 is a plan view showing an arrangement example of a plurality of containers held by a holding unit.

FIG. 4 is a plan view showing an arrangement example of reagent containers and reagent nozzles.

FIG. 5 is a plan view showing an arrangement example of the reagent nozzles and an aspiration nozzle.

FIG. 6 is a transition diagram showing an example of an operation of the holding unit.

FIG. 7 is a plan view showing an arrangement example of the reagent nozzles, the aspiration nozzle, and detachable reagent containers.

DESCRIPTION OF EMBODIMENTS

Hereinafter, preferred embodiments of the automatic analyzer according to the invention will be described with reference to the drawings. The automatic analyzer is a device that analyzes a sample using a reaction liquid in which a sample and a reagent are reacted, such as an automatic biochemical analyzer, an automatic immunoanalyzer, an automatic gene analyzer. In addition, a mass spectrometer used for clinical examination and a coagulation analyzer that measures blood coagulation time can be mentioned. Further, the invention can also be applied to a composite system of a mass spectrometer, a coagulation analyzer, etc. an automatic biochemical analyzer, and an automatic immunoanalyzer, etc., or an automatic analysis system to which these are applied.

Embodiment 1

An example of the overall configuration of an automatic analyzer according to the present embodiment will be described with reference to FIG. 1. The automatic analyzer includes a sample transport unit 102, a reagent storage 104, a sample dispensing unit 105, a reagent dispensing unit 106, a reaction promotion part 107, a measurement unit 108, and a control unit 113. Each of the parts will be described below. The vertical direction is defined as Z direction, and the horizontal plane is defined as XY plane.

The sample transport unit 102 transports a sample container 101 accommodating a sample such as blood or urine to a sample aspiration position 110. The reagent storage 104 stores a reagent container 103 accommodating a reagent to be used for analysis in a predetermined temperature range.

The sample dispensing unit 105 dispenses the sample from the sample containers 101 transported to the sample aspiration position 110 to a reaction vessel arranged in the reaction promotion part 107. In addition, the reaction vessel to which the sample is to be dispensed and a dispensing tip to be used when dispensing the sample are stored in a consumable storage unit 111, and are transported to a predetermined position by a consumable transport unit 112. The reagent dispensing unit 106 dispenses a reagent from the reagent container 103 stored in the reagent storage 104 to the reaction vessel arranged in the reaction promotion part 107 and in which the sample is dispensed. The reaction promotion part 107 promotes the reaction between the sample and the reagent and generates reaction liquid by keeping the reaction vessel in which the sample and the reagent are dispensed within a predetermined temperature range.

The measurement unit 108 is fixed to a housing of the automatic analyzer and performs optical or electrical measurement on the reaction liquid in the reaction vessel transported from the reaction promotion part 107 by a reaction vessel transport unit 109. For example, the absorbance of the reaction liquid, the amount of light emitted when a voltage is applied to the reaction liquid in which the reagent is added, the number of particles in the reaction liquid, the fluctuation of the current value and the voltage value when the reaction liquid comes into contact with an electrode film, etc. are measured. The reproducibility of such measurements deteriorates due to changes in the flow of the reaction liquid. Therefore, in order to reduce the changes in the flow of the reaction liquid, the reaction liquid is aspirated by an aspiration nozzle 201 (see FIG. 2), which is a nozzle fixed to the measurement unit 108. In addition, a reaction liquid and reagent transfer unit 114 allows the reaction vessel 205 (see FIG. 2) accommodating the reaction liquid to access the aspiration nozzle 201 so that the aspiration nozzle 201 fixed to the measurement unit 108 can aspirate the reaction liquid. Details of the reaction liquid and reagent transfer unit 114 will be described later with reference to FIG. 2. The control unit 113 is a device that controls each unit included in the automatic analyzer, and is implemented by, for example, a so-called computer.

An example of the reaction liquid and reagent transfer unit 114 in the present embodiment will be described with reference to FIG. 2. The reaction liquid and reagent transfer unit 114 has a holding unit 204 that holds a plurality of containers and that rotates and moves up and down. The holding unit 204 is arranged below the aspiration nozzle 201 fixed to the measurement unit 108, and is rotated in the XY plane around a rotation shaft 211 or moved up and down along the rotation shaft 211 by a drive source such as a motor (not shown). The containers held by the holding unit 204 are a reaction vessel 205, a first reagent container 206, a second reagent container 207, a third reagent container 208, a cleaning tank 209, and the like, and access to the aspiration nozzle 201 by the rotation and the ascending and lowering of the holding unit 204. In addition, the rotation shaft 211 has a predetermined distance from the aspiration nozzle 201 in the XY plane, and the containers are arranged on the circumference of a circle centered on the rotation shaft 211 with the predetermined distance as a radius so that the containers have access to the aspiration nozzle 201.

The reaction vessel 205 accommodating the reaction liquid is transported from the reaction promotion part 107 to an access point 212 by the reaction vessel transport unit 109. The access point 212 is a position where both the reaction vessel transport unit 109 and the holding unit 204 can access. The holding unit 204 is provided with a reaction vessel installation unit 210 on which the reaction vessel 205 is installed, and when the reaction vessel installation unit 210 moves to the access point 212 due to the rotation of the holding unit 204, the reaction vessel 205 is transferred.

The first reagent container 206, the second reagent container 207, and the third reagent container 208 accommodates different types of reagents including a first reagent, a second reagent, and a third reagent, respectively, and are detachable from the holding unit 204. The reagents accommodated in the reagent containers are auxiliary reagents that assist in measurement such as adjusting the light emission conditions of the reaction liquid and adjusting the flow path and the surface of the electrode of the measurement unit 108. In addition, a first reagent nozzle 202 capable of supplying the first reagent to the first reagent container 206 and a second reagent nozzle 203 capable of supplying the second reagent to the second reagent container 207 are fixed to a reagent tank (not shown) . The reagent tank is fixed to the housing of the automatic analyzer. The reagent from the first reagent nozzle 202 or the second reagent nozzle 203 is supplied when the first reagent container 206 moves below the first reagent nozzle 202 or when the second reagent container 207 moves below the second reagent nozzle 203 due to the rotation of the holding unit 204.

The cleaning tank 209 is used for cleaning the aspiration nozzle 201. The cleaning of the aspiration nozzle 201 is performed by discharging cleaning water from a cleaning nozzle (not shown) to the aspiration nozzle 201 when the cleaning tank 209 moves below the aspiration nozzle 201 due to the rotation of the holding unit 204. The cleaning water discharged to the aspiration nozzle 201 is received in the washing tank 209 and then drained.

Since the rotation and the ascending and lowering of the holding unit 204 that holds a plurality of containers are repeated many times, it is desirable that the control regarding the movement of the holding unit 204 be simplified as much as possible. Therefore, in the present embodiment, the containers held by the holding unit 204 are arranged so that the control regarding the movement of the holding unit 204 can be simplified.

An arrangement example of a plurality of containers held by the holding unit 204 in the present embodiment will be described with reference to FIG. 3. The holding unit 204 in the present embodiment holds the reaction vessel 205 installed on the reaction vessel installation unit 210, the cleaning tank 209, the first reagent container 206, the second reagent container 207, and the third reagent container 208.

In the present embodiment, an angle between adjacent containers is an integer multiple of a predetermined angle $\theta a$, the angle between adjacent containers being an angle between adjacent containers in a circumferential direction and an angle around the rotation shaft 211, which is the center of rotation of the holding unit 204. Specifically, the angles between adjacent containers between the reaction vessel installation unit 210 and the cleaning tank 209, between the cleaning tank 209 and the first reagent container 206, between the first reagent container 206 and the second reagent container 207, and between the second reagent container 207 and the third reagent container 208 are defined as the angle $\theta a$. In addition, the angle between adjacent containers between the reaction vessel installation unit 210 and the third reagent container 208 is $N \cdot \theta a$, which is the product of the integer N and the angle $\theta a$. FIG. 3 shows an example of $\theta a=45$ degrees and $N=4$.

According to the present embodiment, when any one of the plurality of containers held by the holding unit 204 accesses to the aspiration nozzle 201, driving parameters related to the rotation of the holding unit 204 can be shared, so that the control can be simplified. Specifically, since the holding unit 204 rotates based on an angle that is an integer multiple of the predetermined angle θa, a software related to the control can be configured in a simple manner.

Embodiment 2

Embodiment 1 describes that the control related to the rotation of the holding unit 204 is simplified by setting the angle between adjacent containers of the containers held by the holding unit 204 as an integer multiple of the predetermined angle θa. When the containers held by the holding unit 204 include a plurality of reagent containers accommodating reagents, and reagent nozzles supplying the reagents to each of the plurality of reagent containers, it is desirable that each reagent be supplied simultaneously from all reagent nozzles. Therefore, in the present embodiment, the reagent nozzles are arranged so that the control related to the rotation of the holding unit 204 can be simplified and a plurality of reagents can be supplied simultaneously.

An arrangement example of the reagent containers and the reagent nozzles held by the holding unit 204 in the present embodiment will be described with reference to FIG. 4. Similar to Embodiment 1, the holding unit 204 in the present embodiment holds the reaction vessel 205 installed on the reaction vessel installation unit 210, the cleaning tank 209, the first reagent container 206, the second reagent container 207, and the third reagent container 208. In addition, independent of the holding unit 204, the first reagent nozzle 202 and the second reagent nozzle 203 fixed to a reagent tank (not shown) are provided.

In the present embodiment, the angle between reagent nozzles is set such that the first reagent and the second reagent are simultaneously supplied to the first reagent container 206 and the second reagent container 207, the angle being an angle between the first reagent nozzle 202 and the second reagent nozzle 203 and an angle around the rotation shaft 211 of the holding unit 204. Specifically, the angle between the reagent nozzles is set such that when the first reagent nozzle 202 and the first reagent container 206 overlap in the XY plane, the second reagent nozzle 203 and the second reagent container 207 overlap. FIG. 4 shows an example in which an angle between reagent nozzles θb is set to the angle between adjacent containers θa between the first reagent container 206 and the second reagent container 207. The angle between reagent nozzles θb is not limited to the angle between adjacent containers θa, and is appropriately set according to the inner diameter of the first reagent nozzle 202 and the first reagent container 206, and the width of the first reagent container 206 and the second reagent container 207 in the rotation direction of the holding unit 204.

According to the present embodiment, the angle between reagent nozzles is set such that when one reagent container and the reagent nozzle supplying the reagent to the reagent container overlap, the other reagent container and the other reagent nozzle overlap, so that a plurality of reagents can be supplied simultaneously. As a result, the time required for supplying the reagent can be shortened. Similar to Embodiment 1, since the drive parameters related to the rotation of the holding unit 204 can be shared, the control related to the rotation of the holding unit 204 can be simplified.

Embodiment 3

Embodiment 1 describes that the control related to the rotation of the holding unit 204 is simplified by setting an angle between adjacent containers of containers held by the holding unit 204 as an integer multiple of the predetermined angle θa. Embodiment 2 describes that the angle between reagent nozzles is set so that a plurality of reagents can be supplied simultaneously. When a reagent nozzle whose position is fixed is provided in addition to the aspiration nozzle 201, it is not desirable for the nozzle to come into contact with a container that is not accessible. For example, in a case where the aspiration nozzle 201 comes into contact with the third reagent container 208 when the first reagent is supplied from the first reagent nozzle 202 to the first reagent container 206, the third reagent attached to the aspiration nozzle 201 adversely affects the measurement result of the measurement unit 108. Therefore, in the present embodiment, the nozzles are arranged so as to simplify the control related to the rotation of the holding unit 204 and to avoid contact between the container that is not to be accessed and the nozzle.

An arrangement example of a plurality of containers held by the holding unit 204, the aspiration nozzle 201, and the reagent nozzle in the present embodiment will be described with reference to FIG. 5. Similar to Embodiment 1, the holding unit 204 in the present embodiment holds the reaction vessel 205 installed on the reaction vessel installation unit 210, the cleaning tank 209, the first reagent container 206, the second reagent container 207, and the third reagent container 208. In addition, the angles between adjacent containers between the reaction vessel installation unit 210 and the cleaning tank 209, between the cleaning tank 209 and the first reagent container 206, between the first reagent container 206 and the second reagent container 207, and between the second reagent container 207 and the third reagent container 208 are the angle θa. The aspiration nozzle 201, the first reagent nozzle 202, and the second reagent nozzle 203 fixed to the housing of the automatic analyzer are provided. The angle between reagent nozzles θb between the first reagent nozzle 202 and the second reagent nozzle 203 is the angle θa.

In the present embodiment, the nozzles are arranged such that when any of the plurality of containers held by the holding unit 204 accesses to the aspiration nozzle 201, the first reagent nozzle 202 and the second reagent nozzle 203 are positioned between the containers. Alternatively, the nozzles are arranged such that when the first reagent and the second reagent are respectively supplied from the first reagent nozzle 202 and the second reagent nozzle 203 to the first reagent container 206 and the second reagent container 207, the aspiration nozzle 201 is positioned between the containers. Specifically, an inter-nozzle angle between reagent nozzles is set to a value obtained by multiplying a sum of an integer N and a decimal number a by the angle between adjacent containers θa, the angle being an angle between the aspiration nozzle 201 and the first reagent nozzle 202 and an angle around the rotation shaft 211 of the holding unit 204. FIG. 5 shows an example of the inter-nozzle angle θc=112.5 degrees when N=2, α=0.5, and θa=45 degrees. The decimal number α used to calculate the inter-nozzle angle θc is not limited to 0.5, and is appropriately set according to the outer diameter of the aspiration nozzle 201 or the first reagent nozzle 202, the first reagent container 206, and the width between the containers in the rotation direction of the holding unit 204.

An example of an operation of the holding unit 204 that accesses a plurality of containers to the nozzles arranged as shown in FIG. 5 will be described with reference to FIG. 6. In FIG. 6, the aspiration nozzle 201, the first reagent nozzle 202, and the second reagent nozzle 203 fixed to the housing of the automatic analyzer are shown in black. The direction in which the holding unit 204 rotates clockwise is defined as the positive rotation direction.

(1) Arrange Reaction Vessel

When the reaction vessel installation unit 210 moves to the access point 212 due to the rotation of the holding unit 204, the reaction vessel transport unit 109 transports the reaction vessel 205 from the reaction promotion part 107 and installs the reaction vessel 205 on the reaction vessel installation unit 210. At this time, the first reagent container 206 is arranged below the aspiration nozzle 201. When the reaction vessel 205 is installed on the reaction vessel installation unit 210, the reaction vessel transport unit 109 retracts.

(2) Aspirate First Reagent

When the first reagent container 206 accesses the aspiration nozzle 201 due to the ascending of the holding unit 204, the aspiration nozzle 201 aspirates the first reagent from the first reagent container 206. By aspirating the first reagent, the flow path of the measurement unit 108 and the surface of the electrode are prepared. At this time, in the XY plane, the first reagent nozzle 202 and the second reagent nozzle 203 are arranged between the reaction vessel 205 installed on the reaction vessel installation unit 210 and the third reagent container 208, so that the first reagent nozzle 202 and the second reagent nozzle 203 do not come into contact with any of the containers.

(3) Aspirate Reaction Liquid

When the reaction vessel 205 installed on the reaction vessel installation unit 210 accesses the aspiration nozzle 201 due to the lowering and rotation by −90 degrees and ascending of the holding unit 204, the aspiration nozzle 201 aspirates the reaction liquid from the reaction vessel 205. Since the reaction liquid is aspirated by the aspiration nozzle 201 fixed to the housing of the automatic analyzer, the flow of the reaction liquid does not change, and the components of the reaction liquid transferred to the measurement unit 108 are uniform. At this time, in the XY plane, the first reagent nozzle 202 is arranged between the first reagent container 206 and the second reagent container 207, and the second reagent nozzle 203 is arranged between the second reagent container 207 and the third reagent container 208, so that the first reagent nozzle 202 and the second reagent nozzle 203 do not come in contact with any of the containers.

(4) Clean Aspiration Nozzle

When the cleaning tank 209 accesses the aspiration nozzle 201 due to the lowering and rotation by 45 degrees and ascending of the holding unit 204, an outer surface of aspiration nozzle 201 is cleaned. At this time, in the XY plane, the first reagent nozzle 202 is arranged between the second reagent container 207 and the third reagent container 208, and the second reagent nozzle 203 is arranged between the reaction vessel 205 installed on the reaction vessel installation unit 210 and the third reagent container 208, so that the first reagent nozzle 202 and the second reagent nozzle 203 do not come in contact with any of the containers.

(5) Aspirate First Reagent

When the first reagent container 206 accesses the aspiration nozzle 201 due to the lowering and rotation by 45 degrees and ascending of the holding unit 204, the aspiration nozzle 201 aspirates the first reagent from the first reagent container 206. At this time, in the XY plane, the first reagent nozzle 202 and the second reagent nozzle 203 are arranged between the reaction vessel 205 installed on the reaction vessel installation unit 210 and the third reagent container 208, so that the first reagent nozzle 202 and the second reagent nozzle 203 do not come in contact with any of the containers.

(6) Remove Reaction Vessel

When the reaction vessel 205 installed on the reaction vessel installation unit 210 moves to the access point 212 due to the lowering of the holding unit 204, the reaction vessel transport unit 109 removes the reaction vessel 205 from the reaction vessel installation unit 210 and transports the reaction vessel 205.

(7) Supply First Reagent and Second Reagent

When the first reagent container 206 and the second reagent container 207 respectively access the first reagent nozzle 202 and the second reagent nozzle 203 due to the rotation by −112.5 degrees and ascending of the holding unit 204, the first reagent and the second reagent are respectively supplied to the first reagent container 206 and the second reagent container 207. At this time, in the XY plane, the aspiration nozzle 201 is arranged between the reaction vessel installation unit 210 and the third reagent vessel 208, so that the aspiration nozzle 201 does not come into contact with any of the containers.

(8) Aspirate Second Reagent

When the second reagent container 207 accesses the aspiration nozzle 201 due to the lowering and rotation by 157.5 degrees and ascending of the holding unit 204, the aspiration nozzle 201 aspirates the second reagent from the second reagent container 207. At this time, in the XY plane, the first reagent nozzle 202 and the second reagent nozzle 203 are arranged between the reaction vessel installation unit 210 and the third reagent container 208, so that the first reagent nozzle 202 and the second reagent nozzle 203 do not come into contact with any of the containers.

After "(8) Aspirate Second Reagent", the step returns to "(1) Arrange Reaction Vessel" due to the lowering and rotation by −45 degrees of the holding unit 204. In addition, the reaction vessel installation unit 210, the cleaning tank 209, the first reagent container 206, and the second reagent container 207 held by the holding unit 204 are arranged according to an order of (3) to (5) and (8) in FIG. 6, that is, an order of accessing to the aspiration nozzle 201. With such an arrangement, the rotation of the holding unit 204 can be further reduced, so that the time required for the analysis step can be shortened.

According to the present embodiment, the inter-nozzle angle is set such that when any of the containers accesses to the aspiration nozzle 201, the reagent nozzles are positioned between the containers, and thus it is possible to avoid contact between the reagent nozzle and the container that does not access to the reagent nozzle. The inter-nozzle angle is set such that when the reagents are supplied from the reagent nozzles to the reagent containers, the aspiration nozzle 201 is positioned between the containers, and thus it is possible to avoid contact between the aspiration nozzle 201 and the container that does not access to the aspiration nozzle 201. By avoiding unnecessary contact between the nozzles and the containers, contamination of the reaction liquid or the reagents can be prevented, and the reproducibility of measurement results can be improved. Similar to Embodiment 1, since the drive parameters related to the rotation of the holding unit 204 can be shared, the control related to the rotation of the holding unit 204 can be simplified.

Embodiment 4

Embodiment 1 describes that the control related to the rotation of the holding unit 204 is simplified by setting the angle between adjacent containers of the containers held by the holding unit 204 as an integer multiple of a predetermined angle θa. When a plurality of reagent containers accommodating reagents are included in the containers held by the holding unit 204, the reagent containers are replaced according to deterioration of the reagent, change of the type of reagent, or the like. In order to improve the workability of replacing the reagent containers, it is desirable that there is no aspiration nozzle or reagent nozzle above the reagent containers. Therefore, in the present embodiment, the nozzles and the containers are arranged so that the control related to the rotation of the holding unit 204 is simplified and the reagent containers can be detached in a state where there is no nozzle thereabove.

An arrangement example of a plurality of containers held by the holding unit 204, and the aspiration nozzle 201 and the reagent nozzles of the present embodiment will be described with reference to FIG. 7. Similar to Embodiment 1, the holding unit 204 in the present embodiment holds the reaction vessel 205 installed on the reaction vessel installation unit 210, the cleaning tank 209, the first reagent container 206, the second reagent container 207, and the third reagent container 208. In addition, the first reagent container 206, the second reagent container 207, and the third reagent container 208 are detachable containers that are detachable from the holding unit 204. Further, the aspiration nozzle 201, the first reagent nozzle 202, and the second reagent nozzle 203 fixed to the housing of the automatic analyzer are provided.

In the present embodiment, an angle around the rotation shaft 211 of the holding unit 204, which is an angle from an end nozzle of one of the aspiration nozzle 201 and the first reagent nozzle 202 and the second reagent nozzle 203 to an end nozzle of the other one of the aspiration nozzle and the first reagent nozzle 202 and the second reagent nozzle 203, is called an angle between end nozzles. In addition, an angle around the rotation shaft 211 of the holding unit 204, which is an angle from an end detachable container of one of a plurality of detachable containers to an end detachable container of other detachable containers of a plurality of detachable containers, is called an angle between end containers. A sum of the angle between end nozzles and the angle between end containers is set to be equal to or less than 360 degrees. FIG. 7 shows an example in which the angle between end nozzles θd=157.5 degrees, the angle between end containers θe=90 degrees, and θd+θe=247.5 degrees, which is equal to or less than 360 degrees.

According to the present embodiment, the first reagent container 206, the second reagent container 207, and the third reagent container 208, which are three detachable containers, can be arranged between the aspiration nozzle 201 and the second reagent nozzle 203 due to the rotation of the holding unit 204. As a result, since there is no aspiration nozzle 201 or reagent nozzle above the detachable container, workability related to replacement of the detachable containers can be improved, and the time required for preparation of the analysis process can be shortened. Similar to Embodiment 1, since the drive parameters related to the rotation of the holding unit 204 can be shared, the control related to the rotation of the holding unit 204 can be simplified.

The four embodiments of the invention have been described above. The invention is not limited to the above embodiments, and the constituent elements may be modified without departing from the scope of the invention. In addition, a plurality of constituent elements disclosed in the above embodiment may be appropriately combined. Further, some constituent elements may be deleted from all the constituent elements shown in the above embodiments.

REFERENCE SIGN LIST

101: sample container
102: sample transport unit
103: reagent container
104: reagent storage
105: sample dispensing unit
106: reagent dispensing unit
107: reaction promotion part
108: measurement unit
109: reaction vessel transport unit
110: sample aspiration position
111: consumable storage unit
112: consumable transport unit
113: control unit
114: reaction liquid and reagent transfer unit
201: aspiration nozzle
202: first reagent nozzle
203: second reagent nozzle
204: holding unit
205: reaction vessel
206: first reagent container
207: second reagent container
208: third reagent container
209: cleaning tank
210: reaction vessel installation unit
211: rotation shaft
212: access point

The invention claimed is:

1. An automatic analyzer, comprising:

an aspiration nozzle whose position is fixed and that aspirates a reaction liquid or a reagent; and a holding unit that holds a plurality of containers accommodating the reaction liquid or the reagent, and that rotates and moves up and down, wherein the holding unit holds at least three of the plurality of containers, an angle between adjacent containers is an integer multiple of a predetermined angle, the angle between adjacent containers being an angle between adjacent containers of the plurality of containers in a circumferential direction and an angle around a rotation center of the holding unit wherein, the holding unit rotates based on the angle between adjacent containers, and a reagent nozzle whose position is fixed and that supplies the reagent, wherein the reagent nozzle is fixed to a housing of the automatic analyzer; and wherein an inter-nozzle angle is set such that the reagent nozzle is positioned between the plurality of containers when any one of the plurality of containers accesses to the aspiration nozzle, the inter-nozzle angle being an angle between the reagent nozzle and the aspiration nozzle and an angle around the rotation center of the holding unit.

2. The automatic analyzer according to claim 1, further comprising:

a plurality of reagent nozzles whose positions are fixed and that respectively supply different types of reagents, wherein the plurality of containers include a plurality of reagent containers respectively accommodating different types of reagents, and an angle between reagent nozzles is set to simultaneously supply different types of reagents from the reagent nozzles to the reagent containers, the angle between adjacent reagent nozzles being an angle between adjacent reagent nozzles in the circumferential direction and an angle around the rotation center of the holding unit.

3. The automatic analyzer according to claim 2, wherein the angle between the reagent nozzles is set such that, when a certain reagent container overlaps with a certain reagent nozzle, other reagent containers overlap with other reagent nozzles.

4. The automatic analyzer according to claim 3, wherein the angle between reagent nozzles is equal to the angle between adjacent containers.

5. The automatic analyzer according to claim 1, wherein the inter-nozzle angle has a value obtained by multiplying a sum of the integer and a decimal number by the angle between adjacent containers.

6. An automatic analyzer, comprising:

an aspiration nozzle whose position is fixed and that aspirates reaction liquid or a reagent; and a holding unit that holds a plurality of containers accommodating the reaction liquid or the reagent, and that rotates and moves up and down, wherein the holding unit that holds at least three of the plurality of containers, an angle between adjacent containers is an integer multiple of a predetermined angle, the angle between adjacent containers being an angle between adjacent containers of the plurality of containers in a circumferential direction and an angle around a rotation center of the holding unit wherein, the holding unit rotates based on the angle between adjacent containers, and a reagent nozzle whose position is fixed and that supplies the reagent, wherein the reagent nozzle is fixed to a housing of the automatic analyzer; and wherein the plurality of containers includes a reagent container accommodating the reagent, and an inter-nozzle angle is set such that the aspiration nozzle is positioned between the plurality of containers when the reagent is supplied from the reagent nozzle to the reagent container, the inter-nozzle angle being an angle between the reagent nozzle and the aspiration nozzle and an angle around the rotation center of the holding unit.

7. The automatic analyzer according to claim 1, wherein the containers are arranged according to an order of accessing to the aspiration nozzle.

8. The automatic analyzer according to claim 1, further comprising:

a plurality of reagent nozzles whose positions are fixed and that supply the reagent, wherein the plurality of containers include a plurality of detachable containers that accommodate the reagent and are detachable from the holding unit, and a sum of an angle between end nozzles comprising the aspiration nozzle and the plurality of reagent nozzles and an angle between end containers comprising the plurality of detachable containers is equal to or less than 360 degrees, the angle between end nozzles being an angle from one end nozzle to another end nozzle and an angle around the rotation center of the holding unit, the angle between end containers is an angle from one end detachable container to another end detachable container and an angle round the rotation center of the holding unit.

9. The automatic analyzer according to claim 6, further comprising:

a plurality of reagent nozzles whose positions are fixed and that respectively supply different types of reagents, wherein the plurality of containers include a plurality of reagent containers respectively accommodating different types of reagents, and an angle between reagent nozzles is set to simultaneously supply different types of reagents from the reagent nozzles to the reagent containers, the angle between adjacent reagent nozzles being an angle between adjacent reagent nozzles in the circumferential direction and an angle around the rotation center of the holding unit.

10. The automatic analyzer according to claim 9, wherein the angle between the reagent nozzles is set such that, when a certain reagent container overlaps with a certain reagent nozzle, other reagent containers overlap with other reagent nozzles.

11. The automatic analyzer according to claim 10, wherein the angle between reagent nozzles is equal to the angle between adjacent containers.

12. The automatic analyzer according to claim 6, wherein the inter-nozzle angle has a value obtained by multiplying a sum of an integer and a decimal number by the angle between adjacent containers.

13. The automatic analyzer according to claim 6, wherein the containers are arranged according to an order of accessing to the aspiration nozzle.

14. The automatic analyzer according to claim 6, further comprising:

a plurality of reagent nozzles whose positions are fixed and that supply the reagent, wherein the holding unit includes a plurality of detachable containers that accommodate the reagent and are detachable from the holding unit, and a sum of an angle between end nozzles and an angle between end containers is equal to or less than 360 degrees, the angle between end nozzles being an angle from an end nozzle of one of the aspiration nozzle and the plurality of reagent nozzles to an end nozzle of the other one of the aspiration nozzle and the plurality of the reagent nozzles and an angle around the rotation center of the holding unit, the angle between end containers is an angle from an end detachable container of one of the plurality of detachable containers to an end detachable container of other detachable containers of the plurality of detachable containers and an angle round the rotation center of the holding unit.

* * * * *